United States Patent
Gudgeon

(10) Patent No.: US 9,010,301 B2
(45) Date of Patent: Apr. 21, 2015

(54) RECIPROCATING INTERNAL COMBUSTION ENGINE WITH TWO-STAGE EXHAUST SYSTEM

(75) Inventor: Justin Gudgeon, Northumberland (GB)

(73) Assignee: Hotchkiss Super Deltic Ltd., Northumberland (GB)

( * ) Notice: Subject to any disclaimer, the term of this patent is extended or adjusted under 35 U.S.C. 154(b) by 0 days.

(21) Appl. No.: 13/577,191

(22) PCT Filed: Feb. 3, 2011

(86) PCT No.: PCT/IB2011/000184
§ 371 (c)(1),
(2), (4) Date: Aug. 3, 2012

(87) PCT Pub. No.: WO2011/095879
PCT Pub. Date: Aug. 11, 2011

(65) Prior Publication Data
US 2012/0306207 A1  Dec. 6, 2012

Related U.S. Application Data

(60) Provisional application No. 61/300,974, filed on Feb. 3, 2010.

(51) Int. Cl.
| | | |
|---|---|---|
| F02B 41/10 | (2006.01) | |
| F02B 77/14 | (2006.01) | |
| F01D 1/06 | (2006.01) | |
| F01D 1/02 | (2006.01) | |
| F01D 15/10 | (2006.01) | |
| F02B 75/28 | (2006.01) | |
| F02B 75/02 | (2006.01) | |

(52) U.S. Cl.
CPC ...... *F01D 1/06* (2013.01); *F01D 1/026* (2013.01); *F01D 15/10* (2013.01); *F02B 41/10* (2013.01); *F02B 75/282* (2013.01); *F02B 2075/027* (2013.01); *Y02T 10/163* (2013.01); *F05D 2220/62* (2013.01)

(58) Field of Classification Search
USPC .............. 123/54.1, 188.1, 217, 315, 406.48
See application file for complete search history.

(56) References Cited

U.S. PATENT DOCUMENTS

| | | | | |
|---|---|---|---|---|
| 1,328,484 | A | * 1/1920 | Bennett | 123/44 R |
| 1,428,925 | A | 9/1922 | Thomas | |
| 1,765,716 | A | 6/1930 | Curtis et al. | |
| 1,838,308 | A | * 12/1931 | Higman | 123/50 R |
| 1,849,170 | A | * 3/1932 | Buchi | 60/605.1 |
| 2,024,202 | A | * 12/1935 | Berger | 60/602 |
| 2,051,436 | A | * 8/1936 | Curtis | 123/65 V |
| 2,434,777 | A | * 1/1948 | Welsh | 60/595 |
| 2,581,669 | A | * 1/1952 | Guercken | 60/613 |
| 2,583,651 | A | * 1/1952 | Horning, Jr. | 60/612 |
| 2,624,171 | A | 1/1953 | Kollsman | |

(Continued)

FOREIGN PATENT DOCUMENTS

DE  96886  * 6/1897

*Primary Examiner* — Lindsay Low
*Assistant Examiner* — Kevin Lathers
(74) *Attorney, Agent, or Firm* — Jansson Munger McKinley and Shape Ltd.

(57) ABSTRACT

Two-stage exhaust apparatus for a reciprocating internal combustion engine having one or more cylinders each with at least one piston and at least one exhaust port, the apparatus including a first-stage jet port in each cylinder, the jet port configured to open to release high-pressure exhaust gas to a high-pressure motor prior to exhaust-port opening.

18 Claims, 11 Drawing Sheets

(56) References Cited

U.S. PATENT DOCUMENTS

| | | |
|---|---|---|
| 2,858,666 A | 11/1958 | Fullemann |
| 3,042,012 A | 7/1962 | Buchi |
| 3,093,959 A | 6/1963 | Birmann |
| 4,535,592 A | 8/1985 | Zinsmeyer |
| 6,035,637 A * | 3/2000 | Beale et al. .................... 60/595 |
| 7,469,664 B2 * | 12/2008 | Hofbauer et al. ............ 123/54.1 |

* cited by examiner

RECIPROCATING INTERNAL COMBUSTION ENGINE WITH TWO-STAGE EXHAUST SYSTEM

FIELD OF THE INVENTION

This invention is related generally to reciprocating internal combustion engines and, more specifically, to the exhaust cycle and apparatus in such engines.

BACKGROUND OF THE INVENTION

In a conventional reciprocating internal combustion (RIC) engine, atomized liquid fuel and air are introduced into a cylinder through a port or valve, where the fuel/air mixture is ignited and burns rapidly during a single sweep of the piston in the cylinder. This occurs through a half-turn of the engine crankshaft and is conventionally referred to as a "power stroke." FIG. 1A is schematic representation of such an engine stroke. In a conventional gasoline RIC engine, the fuel/air mixture is ignited with a spark, and in a Diesel engine, the compression of the mixture is high enough that ignition occurs without the aid of a spark.

The sweep or "stroke" of the piston down the cylinder, driven by the pressure of the burning gas, ends at the limit of the rotation of the crankshaft. When the piston has reached the low extreme of its movement in the cylinder, referred to as the "bottom dead center" (BDC) of the stroke, the highly-pressurized gas is released, bursting out into the atmosphere through a valve or port which opens in synchrony with the rotation of the crankshaft. This half-turn of the crankshaft is conventionally referred to as an "exhaust stroke." FIG. 1B is schematic representation of such an engine stroke.

A conventional RIC engine converts the chemical potential energy of the fuel into mechanical energy and heat. Most of the heat energy produced is lost to the atmosphere in the exhaust gases which exit the combustion chamber directly to the atmosphere. At the point of exit, the combustion (exhaust) gases are very hot and at high pressure, thus containing a lot of energy.

As described above, the operation of a conventional RIC engine includes the unimpeded passage of exhaust gases from the combustion chamber to the atmosphere. Any restriction placed on the free exit of the exhaust gases reduces the efficient functioning of the engine which results from the rapid expansion of the gases at the point of exit, losing both pressure and heat, largely wasting the heat/pressure energy of the exhaust gases.

At the end of the exhaust stroke, when the piston has been carried to the top of the cylinder, all the energy contained in the exhaust gas has been dumped into the atmosphere and therefore lost. The inventive two-stage exhaust system disclosed herein avoids this wasteful loss of energy by introducing a means by which exhaust gases can exit the cylinder in two stages. The first stage diverts the high-pressure gases into a mechanical motor which can utilize such high-pressure gas as its driving force (source of energy). The second stage of the inventive exhaust system allows the free flow of residual exhaust gases to exit the engine in the normal manner.

A commonly-used turbine/compressor (turbocharger) connected to the exhaust manifold of a conventional RIC engine is designed to capture residual exhaust energy without restricting the flow of gases. These turbines change the flow direction of the high-velocity gases, and the resulting reaction is the spinning-up of the turbine, leaving the gas flow with diminished kinetic energy. In such a system, there is little pressure change in the turbine rotor blades, meaning that typically less than 5% of the energy in the exhaust is recovered. The present invention overcomes this limitation.

The inventive two-stage exhaust system produces two sources of power output from one source of fuel input. A conventional RIC engine produces only one source of power output from the fuel input, i.e., the rotational force produced at the engine crank. This is true even of the so-called hybrid RIC engines because the power output from these engines is still only produced at the flywheel. In this sense, these engines are not hybrid engines but only engines driving hybrid powertrains.

An engine with the inventive two-stage exhaust engine is a true hybrid engine. It produces two independent power outputs, the conventional mechanical power derived at the crankshaft plus the electrical power generated from first-stage exhaust gases, using no extra fuel. These two power outputs are not parasitic upon each other. The mechanical power produced at the crankshaft is not diminished by the electrical power drawn from the first-stage exhaust. This means there is a clear net addition to the power output of the two-stage exhaust engine.

The total energy output of a RIC engine, including all forms of energy produced, is 100% of the heat energy contained in the liquid fuel consumed by it, assuming complete combustion of the fuel in the cylinder. However, the best examples of RIC efficiency today can convert no more than 50% of this heat energy into mechanical energy; the remainder is lost. The use of the inventive two-stage exhaust system in a reciprocating internal combustion engine may increase the overall mechanical output of the RIC engine significantly, perhaps by as much as 40% or more, due to the ability of the inventive system to capture the immense gas pressure produced by the confined fuel/air combustion which is normally lost into the atmosphere in a conventional engine with a conventional exhaust valving system.

The inventive two-stage exhaust system greatly reduces the loss of the energy in the exhaust gas by allowing the high pressure energy contained in the "spent" combustion gases to be further converted into mechanical energy via a unique "jet port" or "jet valve" which directs a proportion of the high-energy combustion gases into a motor which can covert the high-pressure gas into electrical energy. The inventive two-stage exhaust system enables a RIC engine to function normally and efficiently without producing exhaust "back-pressures" which interfere with the proper, clean running of the RIC engine. Further, the two-stage exhaust system enables the design of the RIC engine to evolve into a new, more efficient class of prime mover.

OBJECTS OF THE INVENTION

One object of the inventive two-stage exhaust apparatus is to provide a system which recovers wasted energy from the normal operation of a RIC engine.

Another object of the inventive exhaust system is to provide a system which recovers more energy from RIC engine operation than a typical turbocharger system.

Another object of this invention is to provide an exhaust-energy recovery system which produces electrical energy.

Yet another object of this invention is to provide an exhaust-energy recovery concept which is applicable to many types of RIC engines.

A further object of this inventive exhaust system is to provide apparatus which can drive a turbine producing high torque at lower speeds.

An additional object is to provide a system which can utilize a turbine that does not require a gearbox to drive an alternator.

Yet another object of this inventive two-stage exhaust system is to provide an exhaust system which reduces the pumping load on a RIC engine piston as the piston rises at the beginning of its exhaust stroke.

A further object is to provide an exhaust system which reduces the noise produced during the early portion of each exhaust stroke of a RIC engine.

And another object of this invention is to provide an exhaust system which lowers the final exit temperature of the exhaust gas through the conventional exhaust ports of the MC engine.

These and other objects of the invention will be apparent from the following descriptions and from the drawings.

SUMMARY OF THE INVENTION

This invention is two-stage exhaust apparatus for a reciprocating internal combustion engine having one or more cylinders each with at least one piston and at least one exhaust port. The apparatus includes a first-stage jet port in each cylinder, and the jet port is configured to open to release high-pressure exhaust gas to a high-pressure motor prior to exhaust-port opening.

In preferred embodiments of the inventive apparatus, the high-pressure motor is a high-pressure turbine. The high-pressure turbine may include (1) a case which itself includes (a) a cylindrical inner surface, (b) a turbine-inlet conduit formed by the jet port aligned substantially tangential to and terminating at the inner surface, and (c) a turbine-exhaust outlet diverging in cross-section from the inner surface, and (2) a cylindrical rotor having two side walls and a peripheral surface rotationally-engaged with the inner surface, the side walls and peripheral surface forming a plurality of angled chambers in the rotor. The peripheral surface and the chambers define a plurality of circumferentially-spaced chamber openings and between-chamber lands on the peripheral surface. Each land is configured to close the turbine-exhaust outlet; each chamber has a closed bottom and progressively smaller cross-sectional dimensions toward the chamber opening such that each chamber and the turbine-exhaust outlet, when in communication, form a converging-diverging nozzle. Preferably, the progressively smaller cross-sectional dimensions extend toward the chamber opening along a majority of the chamber depth.

In highly-preferred embodiments, the turbine-exhaust outlet exhausts to atmospheric pressure.

Some highly-preferred embodiments include an electrical alternator driven by the high-pressure motor, whereby the engine produces an electrical power output.

In some embodiments of the inventive two-stage exhaust apparatus, the reciprocating internal combustion engine is a four-stroke engine. And in some of these embodiments, the jet port is controlled by a valve.

In some embodiments of the inventive two-stage exhaust apparatus, the reciprocating internal combustion engine is a two-stroke engine.

In some embodiments of the inventive two-stage exhaust apparatus, the reciprocating internal combustion engine is a complementally-opposed-piston engine.

The term "angled" is used herein to describe the orientation of the chambers formed within the turbine rotor. In the turbine disclosed herein, high-pressure gas flows through a jet port from a cylinder of a reciprocating internal combustion engine sequentially into the chambers of the turbine rotor. The orientation of each chamber is such that the desired number of chambers each having a desired (ideal) volume are configured around the rotor, opening on the peripheral surface of the rotor, and aligned as much as possible to the flow through the jet port such that gas flowing out of the jet port impinges as close a possible to perpendicular to a radius of the rotor. The desired or ideal volume of each chamber is determined from the following considerations. If the volume of each chamber is too large, gas flowing into a chamber will lose too much energy by over-expansion. If the volume of each chamber is too small, an insufficient amount of gas will enter a chamber, thereby failing to extract sufficient energy from the jet port flow and allowing the residual high-pressure gas in the jet port to flow back or "bounce" into the cylinder, again lowering the amount of energy captured by the turbine rotor. Thus, the desired volume of each chamber is an ideal volume which depends directly on the swept volume of the each cylinder.

The term "side walls" is used herein to describe portions of the structure of a turbine rotor which contribute to the forming of chambers in a turbine rotor that open at the rotor peripheral surface. It should be understood that such side walls may be formed as an integral part of the rotor, as parts added to the rotor during the manufacture thereof, or as functionally-equivalent elements of the turbine case which equivalently contribute to the formation of chambers in the rotor which are closed by their sides.

DETAILED DESCRIPTION OF PREFERRED EMBODIMENTS

Figure 1B:
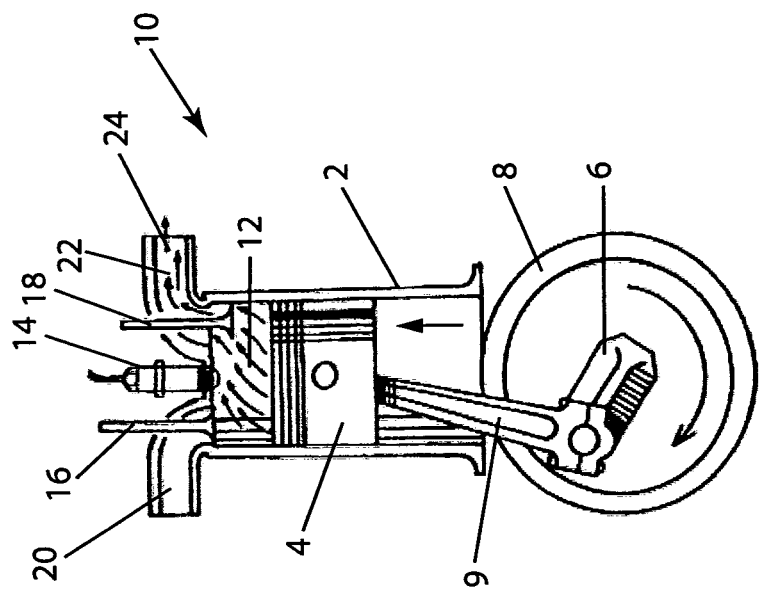
FIGS. 1A and 1B are schematic representations of a power stroke and an exhaust stroke of a conventional (prior art) RIC engine.
Figure 1A:
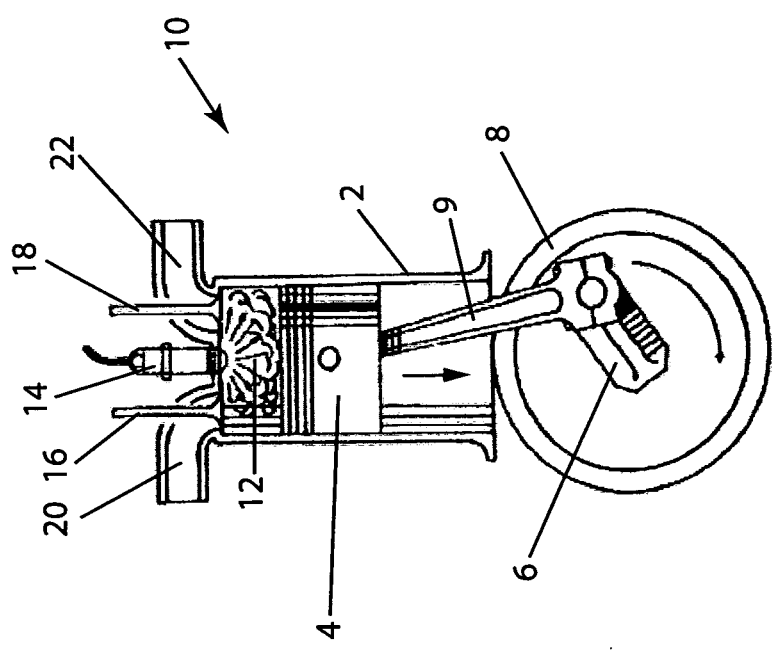

FIGS. 1A and 1B are schematic representations of a power stroke and an exhaust stroke of a conventional (prior art) RIC engine. A brief description of the basic principles of RIC-engine operation are illustrated in these two figures and will be helpful in understanding the operation of the inventive two-stage exhaust apparatus of this document. FIG. 1A illustrates a power stroke in a single piston-and-cylinder apparatus 10 of a RIC engine. A piston 4 moves up and down within a cylinder 2 driven by the expansion of the ignited gases 12 of the fuel/air mixture introduced into cylinder 2 through an intake 20 controlled by an intake valve 16. The fuel/air mixture is ignited by a spark plug 14 causing the gas to expand rapidly, driving piston 4 down in cylinder 2 and driving crankshaft 6 and flywheel 8 through a connecting rod 9.

FIG. 1B illustrates an exhaust stroke in the apparatus of FIG. 1A.

Mechanical energy in the flywheel drives piston 4 up in cylinder 2 while an exhaust valve 18 is open, allowing exhaust gas 12 to exit cylinder 2 through an exhaust manifold 22 in an exhaust stream 24 at low pressure.

As was described above, a considerable amount of heat energy and mechanical energy stored in the hot, high-pressure gas in cylinder 2 at the end of the power stroke is lost to the atmosphere in such normal RIC-engine operation.

The inventive two-stage exhaust system is apparatus by which the combustion gases generated within a RIC engine are deployed in two stages. The first stage allows maximum combustion pressures to drive any sort of mechanical motor requiring high-pressure gas as its driving force (source of energy); the second stage allows the free flow of residual exhaust gases to exit the engine in the normal manner.

In the first exhaust stage, the combustion gases in the cylinder have expanded and forced the piston to the limit of its stroke (bottom dead center-BDC). During the cycle, a valve or port opens so that a powerful "jet" of pressurized gas is diverted into a conduit to drive some type of high pressure motor. The second exhaust stage begins with the return stroke (when the piston is still at BDC) in the four-stroke cycle. The piston forces the residual combustion gases out through an exhaust port as it proceeds towards top dead center (TDC). In a two-stroke engine, the second exhaust stage occurs at the end of the power stroke when the in-rush of gas for the next power stroke forces the residual exhaust gas through the exhaust port.

Figure 2:
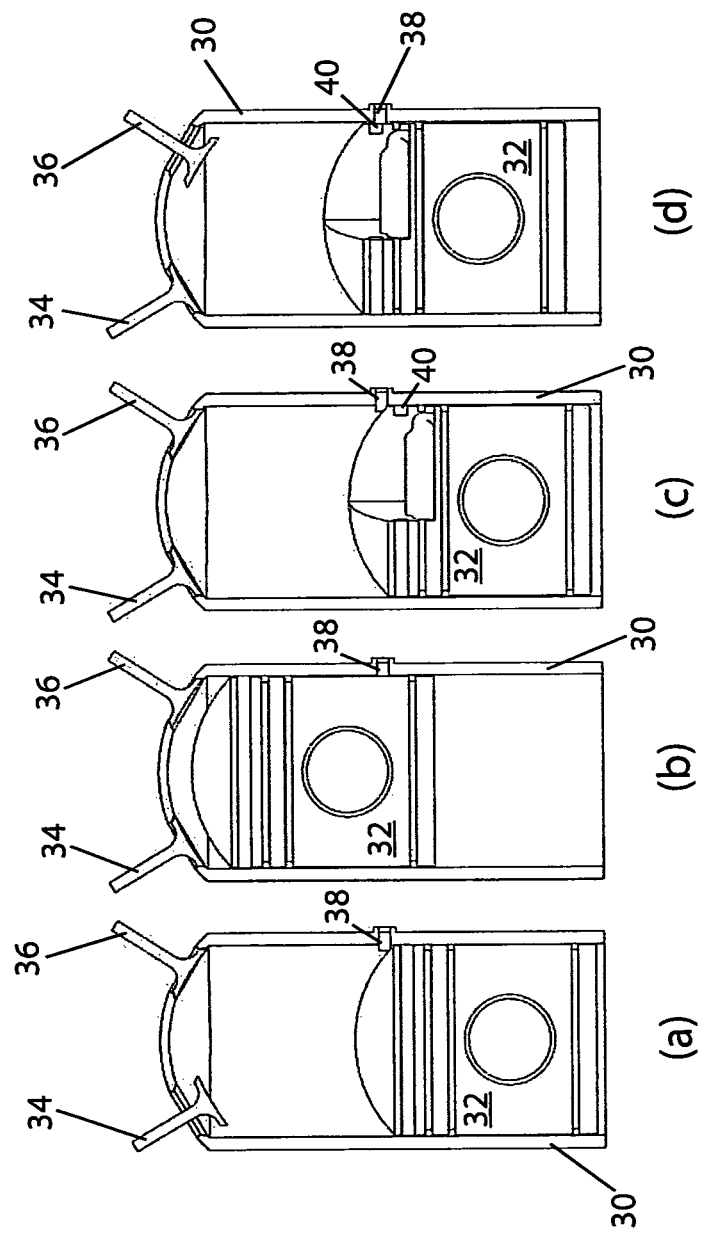
FIG. 2 is a schematic illustration of four piston-in-cylinder positions describing the operation of a four-stroke Diesel RIC engine with a jet port configured in the wall of the cylinder.

FIG. 2 is a schematic illustration of four piston-in-cylinder positions (a)-(d) describing the operation of a four-stroke Diesel RIC engine with a jet port configured in the wall of the cylinder. A cylinder 30 (reference number 30 indicates the wall of cylinder 30) has a piston 32 with a piston ring 40, an intake valve 34, an exhaust valve 36, and a jet port 38. Position (a) illustrates a piston position at the end of an induction stroke at which point cylinder 30 is filled with a fresh charge of fuel/air mixture. Air flows into cylinder 30 through intake valve 34, and fuel is injected into cylinder 30 by fuel injector (not shown in FIG. 2).

Position (b) in FIG. 2 illustrates a piston position at the end of a compression stroke at which point the fuel/air mixture is compressed to the point at which it will ignite to drive piston 32 downward. Position (c) illustrates a piston position at the end of the power stroke (about BDC) at which point jet port 38 channels high-pressure exhaust gases directly to, for example, electrical power-generating apparatus or other energy conversion device (not shown in FIG. 2). Jet port 38 is closed or open simply depending on the position of piston 32 in cylinder 30 and the position of jet port 38 itself. Jet port 38 could be placed in many different positions along the cylinder depending on where in the exhaust stroke one wishes to capture the high-pressure exhaust gas of the first stage.

Position (d) in FIG. 2 illustrates a piston position just after BDC (maybe about 2-3 degrees after BDC), at which point jet port 38 is now closed again and the second stage of the two-stage exhaust begins. Exhaust valve 36 is open to permit the free flow of residual exhaust gas from cylinder 30.

Figure 3:
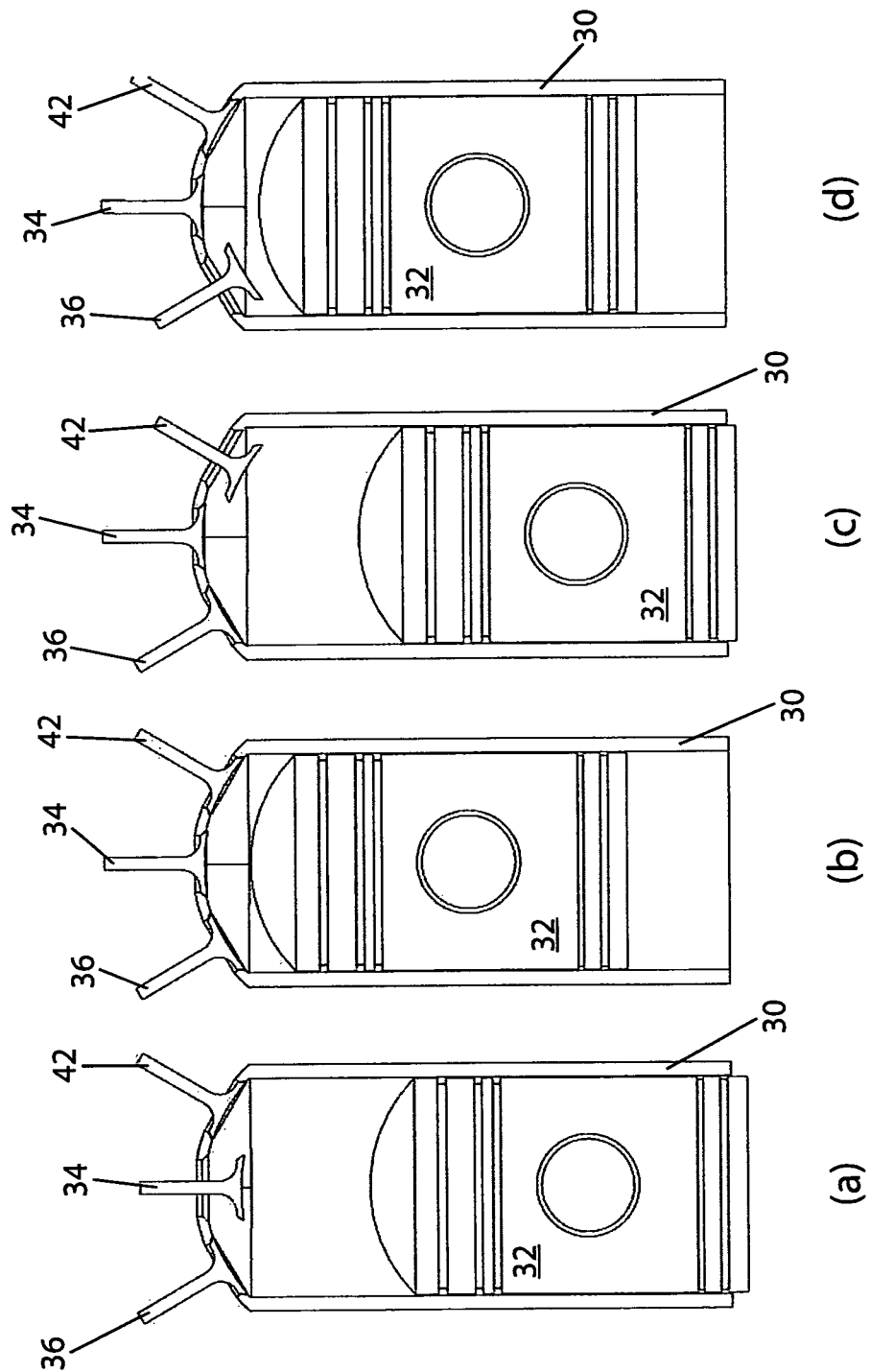
FIG. 3 is a schematic illustration of four piston-in-cylinder positions describing the operation of a four-stroke Diesel or gas RIC engine, with a jet port configured at the top of the cylinder and controlled by a valve.

FIG. 3 is a schematic illustration of four piston-in-cylinder positions describing the operation of a four-stroke Diesel or gas RIC engine in which a jet port is configured at the top of the cylinder and controlled by a valve. Jet port 38 of FIG. 2 is replaced by a jet port valve 42 (jet port controlled by a valve) at the top of cylinder 30. In a Diesel embodiment having jet port valve 42, fuel is introduced into cylinder 30 via a fuel injector (not shown in FIG. 3), and in a gas-fueled embodiment having jet port valve 42, fuel is introduced into cylinder 30 by a carburetor through intake valve 34 or via a fuel injector (not shown in FIG. 3).

Position (a) in FIG. 3 illustrates a piston position at the end of an induction stroke at which point cylinder 30 is filled with a fresh charge of fuel/air mixture. Air flows into cylinder 30 through intake valve 34, and fuel is introduced as described above.

Position (b) in FIG. 3 illustrates a piston position at the end of a compression stroke at which point the fuel/air mixture is compressed to the point at which it will ignite to drive piston 32 downward. Position (c) illustrates a piston position at the end of the power stroke (maybe about 2-3 degrees before BDC) at which point jet port valve 42 channels high-pressure exhaust gases directly to, for example, electrical power-generating apparatus or other energy conversion device (not shown in FIG. 3). This position is followed immediately by an exhaust stroke, a point near the end of which is illustrated in position (d) of FIG. 3. Exhaust valve 36 is open, allowing the free flow of residual exhaust gas to exit cylinder 30.

Figure 4:
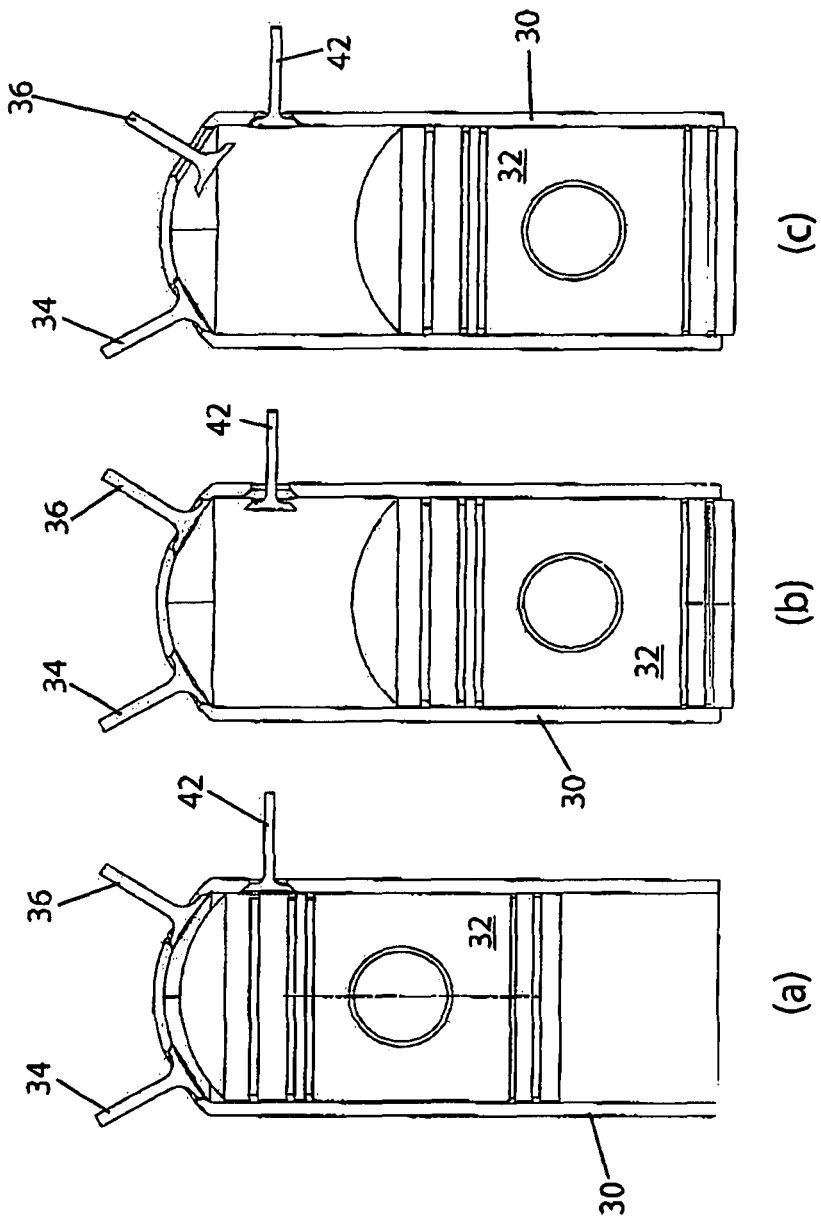
FIG. 4 is a schematic illustration of three piston-in-cylinder positions describing the operation of an alternate embodiment of a four-stroke Diesel or gas RIC engine, with a jet port configured on the side of the cylinder and controlled by a valve.

FIG. 4 is a schematic illustration of three piston-in-cylinder positions describing the operation of an alternate embodiment of a four-stroke Diesel or gas RIC engine. This embodiment is similar to that of FIG. 3 but with jet port valve 42 placed on the side of cylinder 30. Position (a) illustrates a piston position at the end of a compression stroke. Position (b) illustrates a piston position at the beginning of an exhaust stroke (maybe about 2-3 degrees before BDC); the first stage of the exhaust system is operating with jet port valve 42 open to channel high-pressure exhaust gas to an energy-conversion device (not shown). Position (c) in FIG. 3 illustrates a piston position just after piston position (b), at the beginning of exhaust system second-stage operation (maybe about 2-3 degrees after BDC), at which point exhaust valve 36 is open to allow the free flow of residual exhaust gas to exit cylinder 30.

Figure 5:
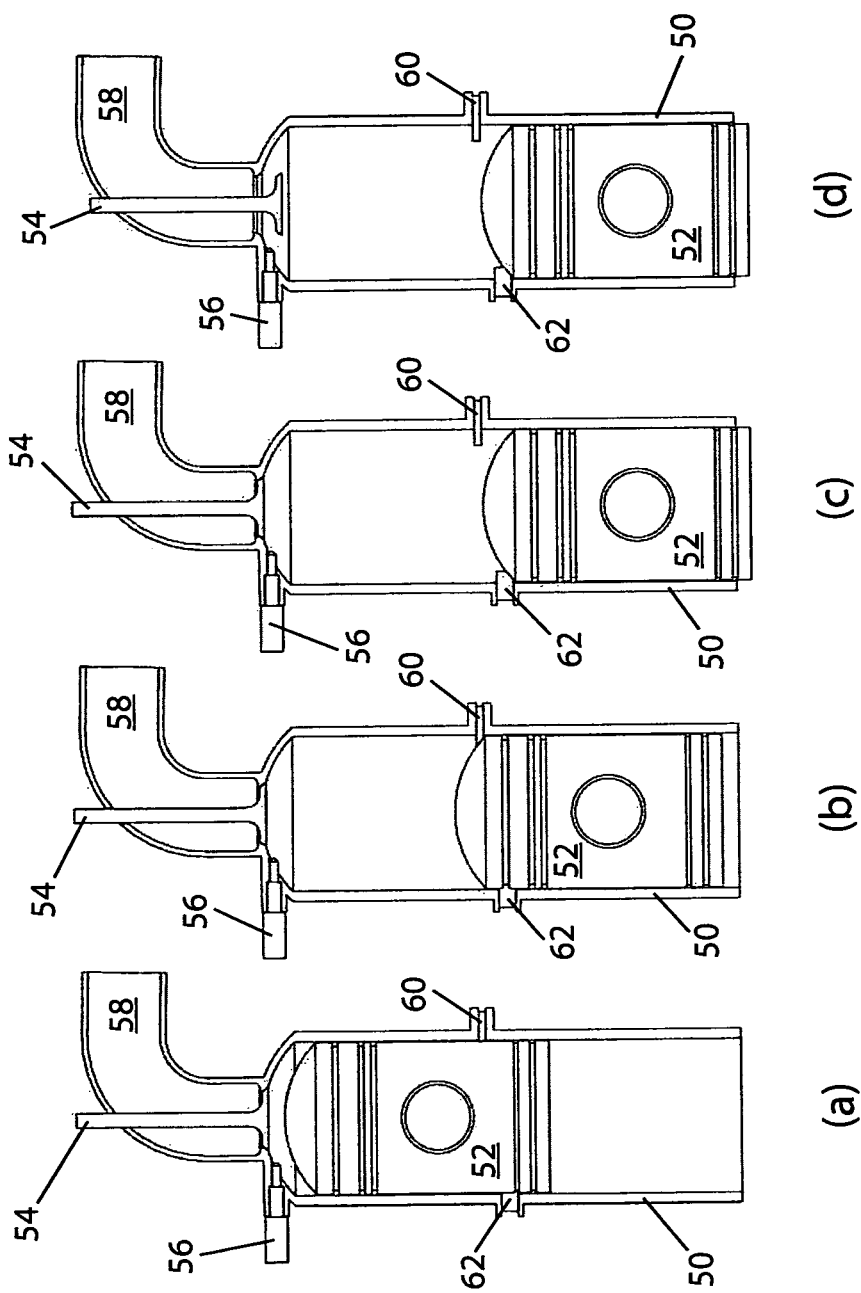
FIG. 5 is a schematic illustration of four piston-in-cylinder positions describing the operation of a two-stroke Diesel MC engine with a jet port configured in the wall of the cylinder.

FIG. 5 describes yet another embodiment of the inventive two-stage exhaust apparatus, illustrating four piston-in-cylinder positions which describe the operation of a two-stroke Diesel RIC engine with a jet port configured in the wall of the cylinder. A cylinder 50 (reference number 50 indicates the wall of cylinder 50) has a piston 52, an air intake valve 54 and pressurized air intake manifold 58, exhaust port 62, fuel injector 56, and jet port 60. Position (a) in FIG. 5 illustrates a piston position at the beginning of a power stroke. The fuel/air mixture has been compressed in cylinder 50 and ignites to drive piston 52 downward. Position (b) illustrates a piston position maybe 5-10 degrees before BDC, at the beginning of the first-stage operation of the staged exhaust system. Jet port 60 is open (uncovered), channeling high-pressure exhaust gas to an energy-conversion device (not shown).

Position (c) in FIG. 5 illustrates a piston position at or very near BDC at which point exhaust port 62 is open (uncovered). Position (d) follows immediately after position (c), illustrating the opening of intake valve 54 to permit the forced flow of air into cylinder 50, which purges cylinder 50 of residual exhaust gas through exhaust port 62 (second-stage exhaust system operation) and provides a fresh charge of air in cylinder 50.

One very practical and efficient application of the inventive two-stage exhaust system is with a Super Deltic engine. A Super Deltic engine is a two-stroke, complementally-opposed-piston RIC Diesel engine in which a single cycle (each rotation of the crankshaft) produces one power stroke and one exhaust stroke.

Figure 6:
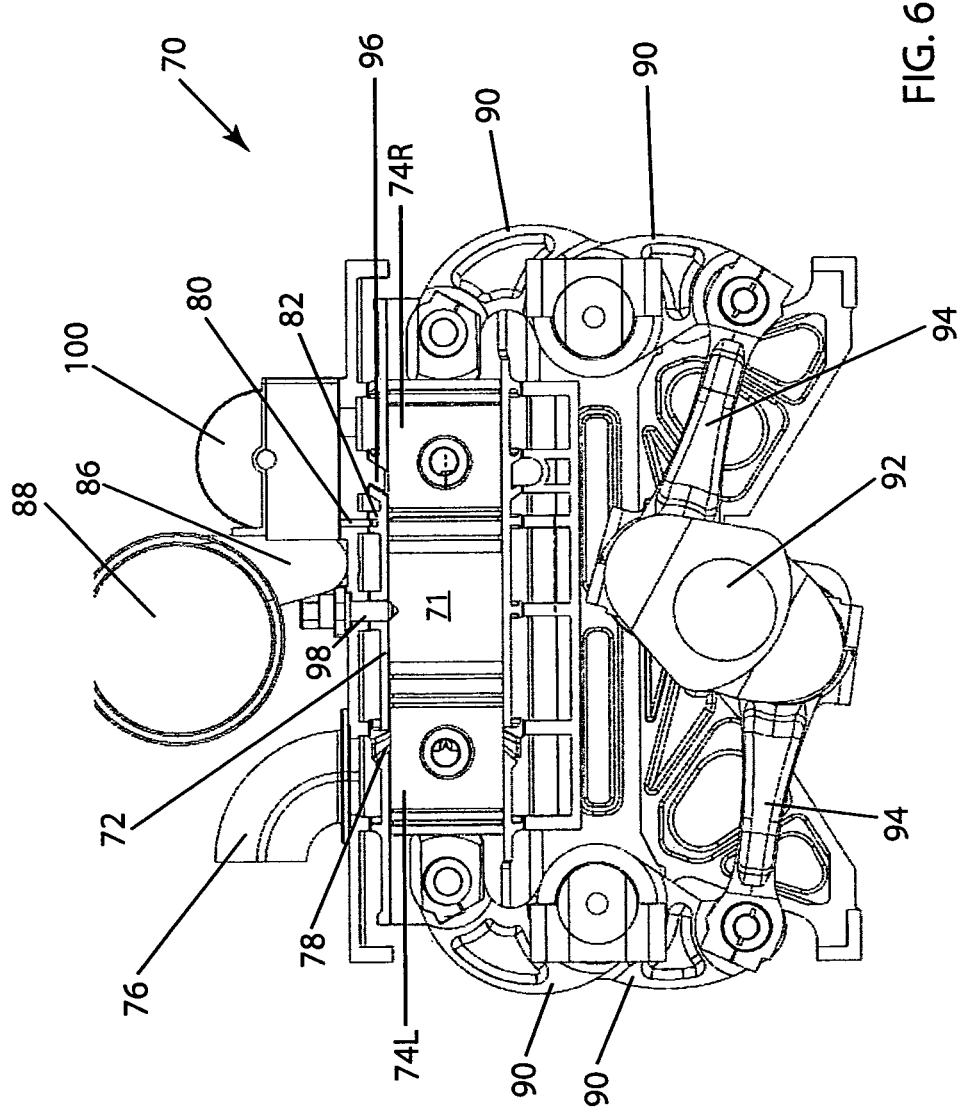
FIG. 6 is a schematic illustration of a Super Deltic MC engine with a jet port configured in the wall of the cylinder.

FIG. 6 is a schematic illustration of a Super Deltic RIC engine with a jet port configured in the wall of the cylinder. A Super Deltic engine 70 includes a cylinder 71 with a cylinder wall 72, left piston 74L and right piston 74R arranged in opposition to each other within cylinder 71, a pressurized air intake manifold 76 and air intake ports 78 (one shown in FIG. 6), fuel injector 98, exhaust ports 96 (one shown in FIG. 6), and a jet port 80. Mechanical power is transmitted through four linkages 90 to two connecting rods 94 to drive crankshaft 92. The two-stage exhaust system includes a high-pressure turbine 100, an exhaust discharge manifold 86 and an exhaust pipe 88. Jet port 80 is a conduit passing through a portion of an engine block 82.

Figure 7:
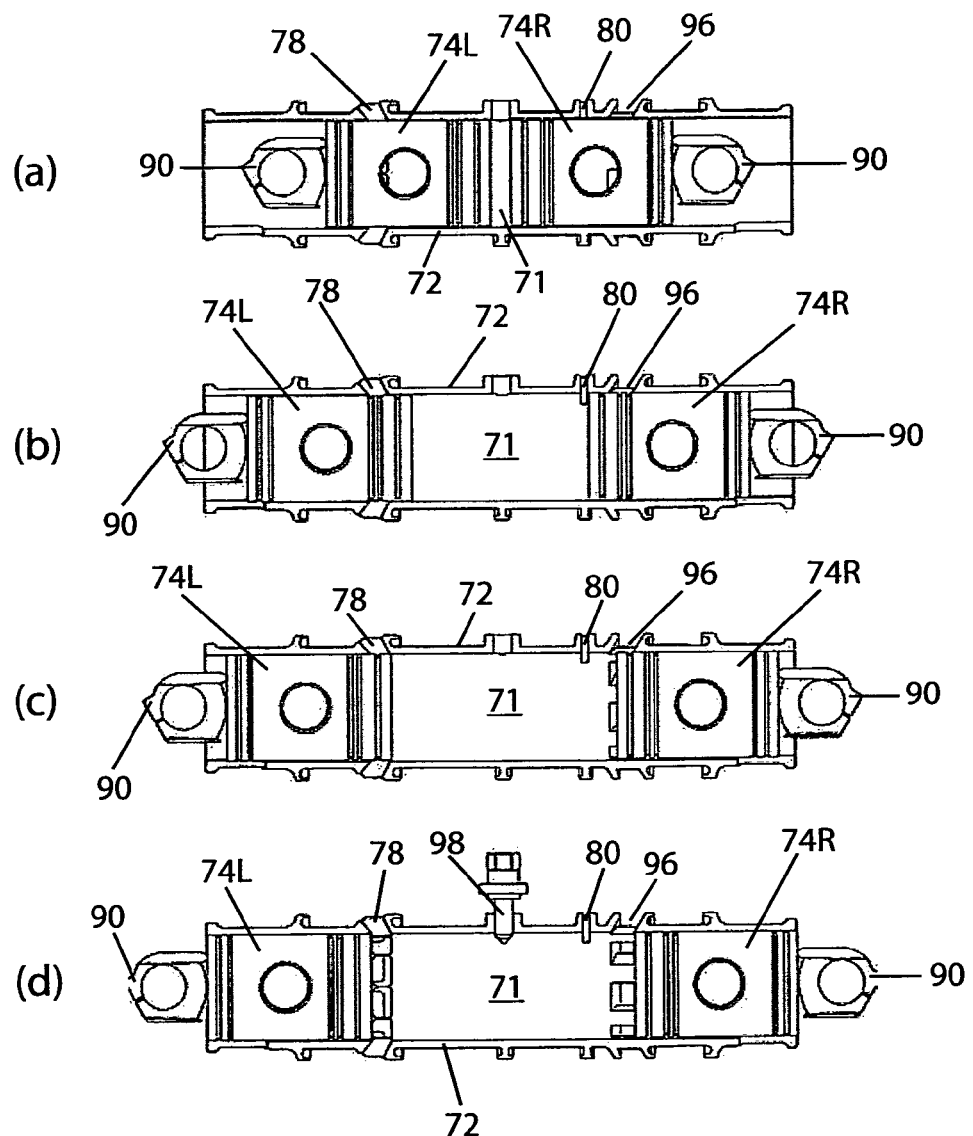
FIG. 7 is a schematic illustration of four piston-in-cylinder positions describing the operation of the Super Deltic MC engine of FIG. 6.

FIG. 7 is helpful in describing the operation of the Super Deltic engine with the two-stage exhaust system. FIG. 7 is a schematic illustration of four piston-in-cylinder positions of the Super Deltic RIC engine of FIG. 6. Position (a) illustrates piston positions at top dead center (TDC) of the piston stroke. The fuel/air mixture is fully compressed and ready to ignite. (Note that fuel injector 98 is only shown in the drawing of position (d).) Position (b) illustrates piston positions a few degrees (maybe about 5-10 degrees) before the equivalent BDC center position, at which point jet port 80 is open (uncovered) to channel high-pressure exhaust gas to turbine 100 or other energy-recovery device. Position (b) illustrates the operation of the first stage of the two-stage exhaust system. Pistons 74L and 74R both are driven during the power stroke and provide mechanical energy to crankshaft 92.

Position (c) of FIG. 7 illustrates piston positions just before the equivalent BDC position (maybe 2-3 degrees before BDC). At this point in the cycle, the second stage of the exhaust system is beginning to operate. Exhaust ports 96 are opening (being uncovered) to begin the flow of residual exhaust gas from cylinder 71. Position (d) illustrates piston positions at the equivalent BDC position of the piston movement. Air intake ports 78 are open (uncovered) to allow the pressurized flow of air into cylinder 71 to begin creating the next fuel/air mixture charge for cylinder 71. Fuel is introduced via fuel injector 98 after air has filled cylinder 71.

Figure 8:
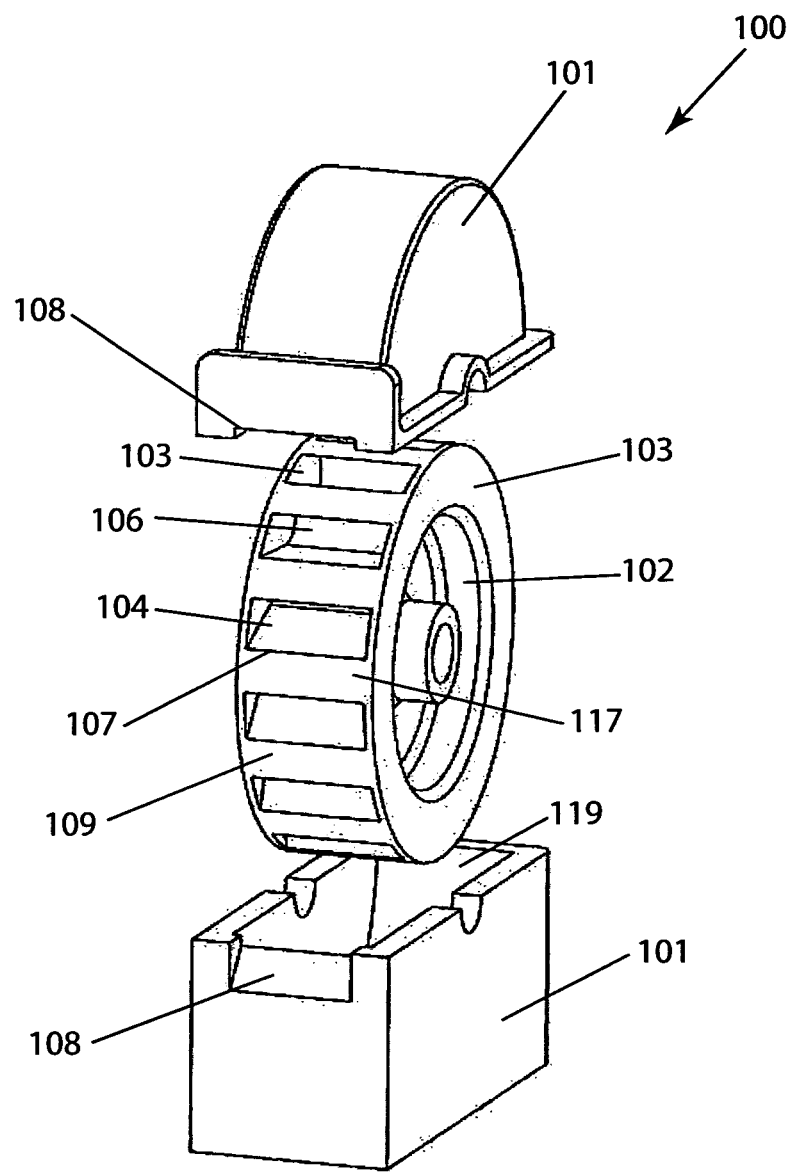
FIG. 8 is an exploded-view perspective drawing of the rotor and case of the turbine which is part of the inventive two-stage exhaust apparatus in FIG. 6.

FIG. 8 is an exploded-view perspective drawing of the rotor and case of turbine 100 which is part of the inventive two-stage exhaust apparatus. Turbine 100 includes a cylindrical rotor 102 turning on a shaft (not shown) within a turbine case 101. Case 101 is shown in two parts within the exploded view of FIG. 8. Case 101 includes an inner surface 119 which is rotationally-engaged with a peripheral surface 117 of rotor 102. Rotor 102 includes two side walls 103 on opposite sides of the rotor. Peripheral surface 117 and side walls 103 form a plurality of angled chambers 104 in rotor 102. Peripheral surface 117 and chambers 104 define a plurality of circumferentially-spaced chamber openings 107 and between-chamber lands 109 on peripheral surface 117. Each land 109 is configured to close a turbine-exhaust outlet 108 when in position over outlet 108. Outlet 108 is shown in two parts in FIG. 8, portion of outlet 108 being integral with the two parts of turbine case 101.

Each chamber 104 has a closed bottom 106, and each chamber 104 has progressively smaller cross-sectional dimensions toward chamber opening 107 such that each chamber 104 and turbine-exhaust outlet 108, when in communication, form a converging-diverging nozzle. (See FIG. 9B for further explanation.)

Figure 9A:
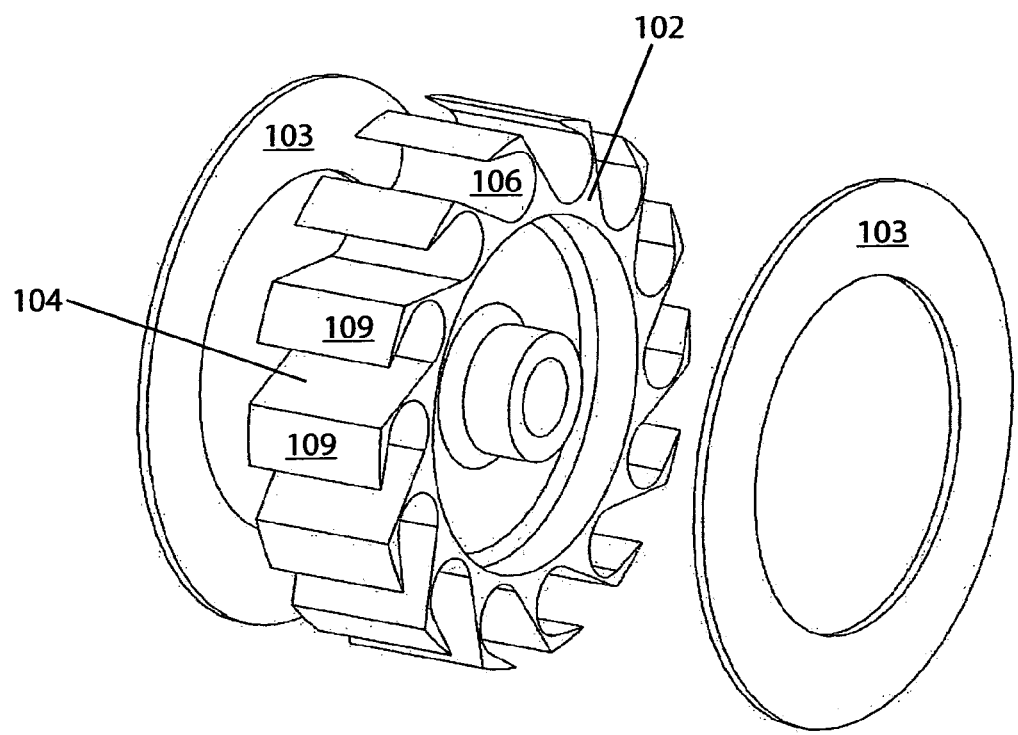
FIG. 9A is an exploded-view perspective drawing of portions of the rotor of FIG. 8.

FIG. 9A is an exploded-view perspective drawing of portions of the rotor of FIG. 8, showing more detail of rotor 102.

Figure 9B:
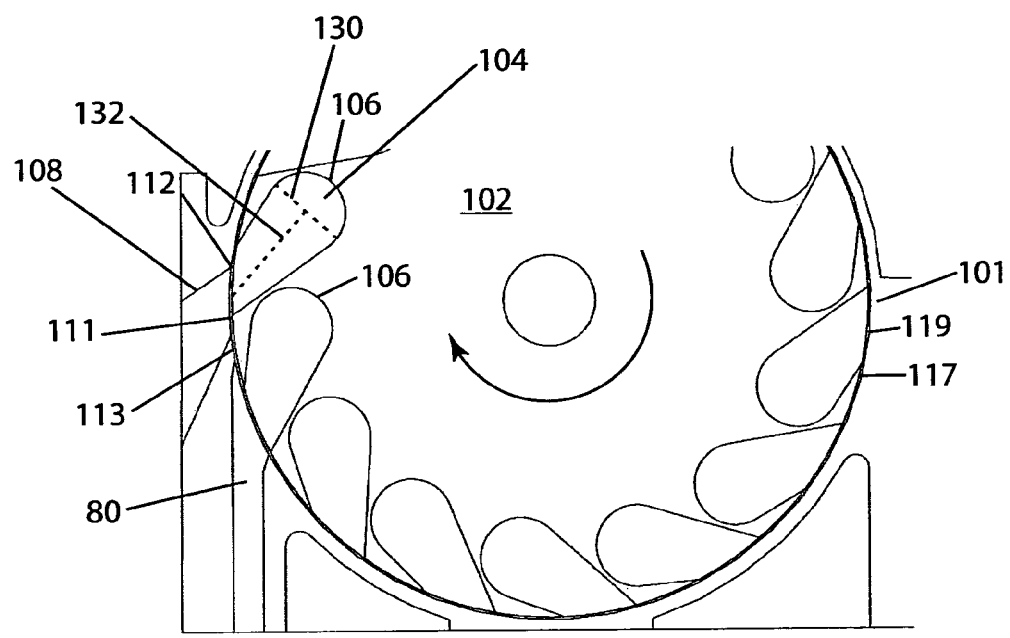
FIG. 9B is a partial cross-sectional drawing of the turbine of FIG. 8.

FIG. 9B is a partial cross-sectional drawing of the turbine of FIG. 8. Line 130 is shown as spanning across chamber 104 at its widest point, and line 132, perpendicular to line 130, illustrates that the progressively smaller cross-sectional dimensions extending toward chamber opening 107 extend along a majority of the chamber depth illustrated by the relative length of line 132 to overall chamber depth, from chamber opening 107 to chamber bottom 106. (Reference number 107 is not in FIG. 9B simply to reduce the crowding of reference numbers. See FIG. 8.) FIG. 9B also illustrates that chamber 104 and exhaust exit 108 form a converging-diverging nozzle when chamber 104 and exhaust exit 108 are in communication with each other because of rotor 102 position. Flow out of chamber 104 flows through the converging section of chamber 104 toward chamber opening 107 (see FIG. 8). Exhaust exit 108 is diverging along the direction of flow from chamber 104. The throat of the converging-diverging nozzle is formed by an upper edge 112 of exhaust exit 108 in inner surface 119 and a lower edge 111 of chamber opening 107 as chamber opening 107 moves past exhaust exit 108. (See FIG. 8.)

The impulse and reaction forces from flow into and out of chamber 104 are substantially perpendicular to a radius of rotor 102. The geometrical relationship of chambers 104 to jet port 80 is nearly constant; thus, the impulse force from gas entering chamber 104 is nearly at right angles to the axis of the 102, producing the greatest amount of torque possible from such flow. Whatever the position of rotor 102, the high-pressure gas exiting chamber 104 through exhaust exit 108 imparts an additional reactive force on rotor 102, also at nearly a right-angle to the axis of rotor 102.

Referring also to FIG. 9B, jet port 80 is substantially-tangential to inner surface 119. Inner surface 119 of case 101 and peripheral surface 117 of rotor 102 are rotationally-engaged such that rotor 102 may turn freely (in the direction indicated). A seal results from a small gap forming a gas-bearing seal between surfaces 119 and 117. A lower edge 113 of exhaust exit 108 provides a narrow seal between the chamber 104 in communication with exhaust exit 108 and the next chamber 104 as rotor 102 turns.

Figure 10:
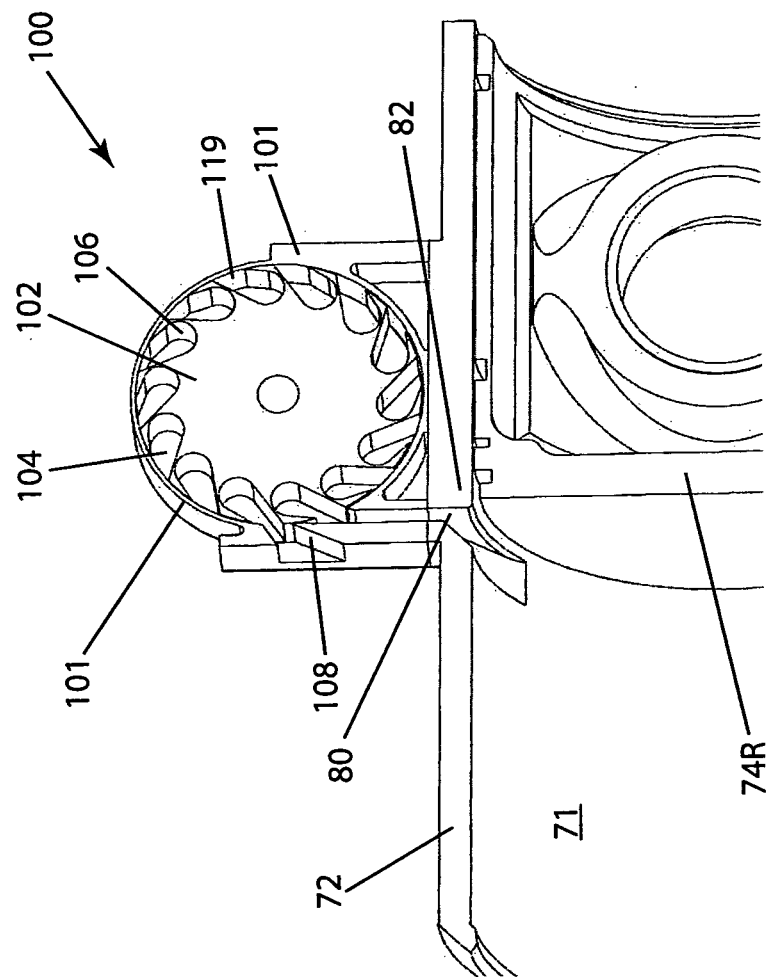
FIG. 10 is an exploded-view perspective cross-sectional drawing of portions of the rotor and case of the turbine of FIG. 8 and showing portions of a piston and cylinder of a RIC engine.

FIG. 10 is an exploded-view perspective cross-sectional drawing of portions of the rotor and case of the turbine of FIG. 8 and showing portions of a piston and cylinder of a RIC engine.

Figure 11:
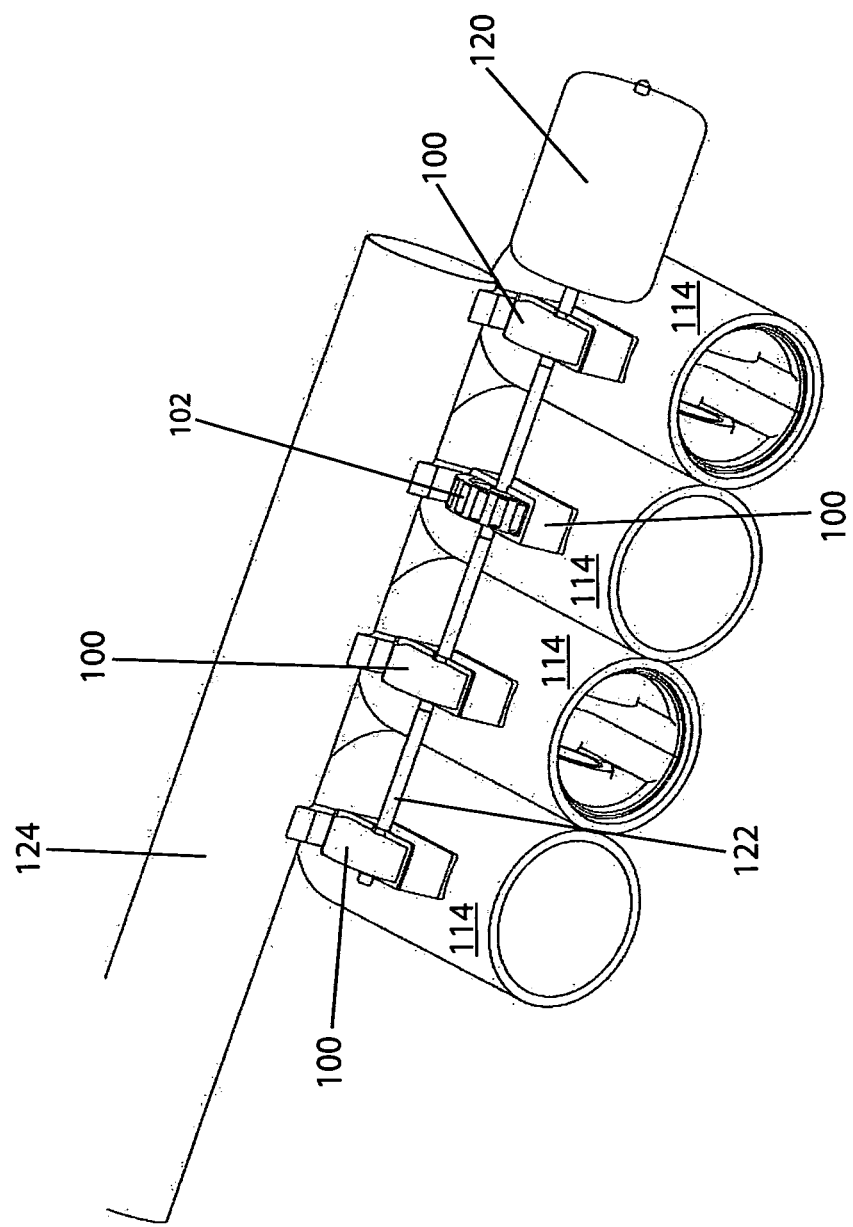
FIG. 11 is a perspective illustration showing four cylinders of a RIC engine, each with its respective turbine being driven by the first-stage of the inventive exhaust system and together driving a common shaft which drives an alternator.

FIG. 11 is a perspective illustration showing four cylinders 114 of a RIC engine, each with its respective turbine 100 being driven by the first-stage of the inventive exhaust system and together driving a common shaft 122 which drives an alternator 120. Alternator 120 is driven by four turbines 100 the rotors 102 of which are mounted on shaft 122. Exhaust pipe 124 carries exhaust away from cylinders 114.

Having one turbine for each cylinder is important. At the point of combustion at TDC, the temperature and pressure are at their highest levels. Since a drop in pressure in a cylinder also means a drop in temperature, at the point of ignition near TDC the increasing volume in a cylinder due to the falling piston produces a dramatic fall in pressure which, in turn, reduces temperature in a cylinder. The volume inside a conventional exhaust manifold is several times that of the volume of a cylinder which means the energy of the escaping gas has already been lost. To avoid a further drop in pressure, the volume of the jet ports of the two-stage exhaust apparatus is very small, thus preventing the combustion gases from either expanding and cooling before impinging on the turbines. Having one turbine for each cylinder enables the use of short (small volume) jet ports.

To drive an alternator under load requires high levels of torque. A small, conventional turbine as used in a typical turbocharger produces very low torque, far too low to drive an alternator. Inventive turbine 100 used as part of the inventive two-stage exhaust apparatus produces high torque and can therefore drive alternator 120 directly without the need for gearing. This is because the turbines such as turbine 100 require low-volume, high-pressure gas to force itself through the apparatus, producing relatively low rotational speeds (<50,000 rpm) at high torque. In comparison, a conventional turbine relies on a high volume of high-velocity gas to pass through the its turbine blades, producing very high speeds (typically over 120,000 rpm) at very low torque.

The gas pressure needed to drive the turbine cannot be achieved without the use of a jet port. Adding a restriction to a normal exhaust port would cause back pressure in the cylinder during the exhaust stroke, thus resisting the rise of the piston during the exhaust stroke. Introducing first-stage operation of the two-stage exhaust apparatus into the engine cycle greatly reduces the gas pressure and temperature in the cylinder during the exhaust stroke, thereby reducing the pumping losses of the engine and increasing overall fuel efficiency.

Due to the greatly reduced temperature and pressure of the combustion gases left in the cylinder after the first-stage release of high-pressure gas through the jet port, an added benefit of the inventive two-stage exhaust apparatus is that the final release of exhaust gas through the conventional exhaust valve creates less noise. More critically, the lower temperature of the exiting exhaust gases greatly reduces the many problems associated with high exhaust gas temperatures.

While the principles of this invention have been described in connection with specific embodiments, it should be understood clearly that these descriptions are made only by way of example and are not intended to limit the scope of the invention.

The invention claimed is:

1. A reciprocating internal combustion engine having (a) one or more cylinders each with at least one piston, each cylinder having a cylinder wall, (b) one high-pressure motor for each cylinder, each high-pressure motor integral with and attached in direct contact with its respective cylinder wall, (c) a crankshaft from which conventional mechanical power is derived, and (d) two-stage exhaust apparatus having in each cylinder (i) at least one exhaust port to release low-pressure residual exhaust gas directly to the atmosphere and (ii) a jet port configured to open to release high-pressure exhaust gas to its corresponding high-pressure motor, the jet port opened only by being uncovered by the position of the piston in the cylinder, jet-port volume being sized to prevent expansion and cooling of exhaust gases released to the high-pressure motor, the exhaust-gas release being prior to exhaust-port opening in order to recover additional power from the engine non-parasitically, without loss of mechanical power from the crankshaft.

2. The reciprocating internal combustion engine of claim 1 wherein there are more than one of the cylinders.

3. The reciprocating internal combustion engine of claim 2 wherein each of the high-pressure motors is a high-pressure turbine.

4. The reciprocating internal combustion engine of claim 3 wherein each of the high-pressure turbines includes:
a case including (a) a cylindrical inner surface, (b) a turbine-inlet conduit formed by the jet port aligned substantially tangential to and terminating at the inner surface, and (c) a turbine-exhaust outlet diverging in cross-section from the inner surface; and
a cylindrical rotor having two side walls on opposite sides of the rotor and a peripheral surface rotationally-engaged with the inner surface, the side walls and peripheral surface forming a plurality of angled chambers in the rotor, the peripheral surface and the chambers defining a plurality of circumferentially-spaced chamber openings and between-chamber lands on the peripheral surface, each land configured to close the turbine-exhaust outlet, each chamber having a closed bottom, and each chamber having progressively smaller cross-sectional dimensions toward the chamber opening such that each chamber and the turbine-exhaust outlet, when in communication, form a converging-diverging nozzle.

5. The reciprocating internal combustion engine of claim 4 wherein the progressively smaller cross-sectional dimensions extend toward the chamber opening along a majority of the chamber depth.

6. The reciprocating internal combustion engine of claim 4 wherein the turbine-exhaust outlets exhaust to atmospheric pressure.

7. The reciprocating internal combustion engine of claim 2 further including an electrical alternator driven by the high-pressure motors, whereby the engine produces an electrical power output.

8. The reciprocating internal combustion engine of claim 2 wherein the engine is a four-stroke engine.

9. The reciprocating internal combustion engine of claim 8 wherein the jet ports are each controlled by a corresponding valve.

10. The reciprocating internal combustion engine of claim 2 wherein the engine is a two-stroke engine.

11. The reciprocating internal combustion engine of claim 10 wherein the engine is a complementally-opposed-piston engine.

12. In a reciprocating internal combustion engine having (a) one or more cylinders each with at least one piston and at least one exhaust port for releasing exhaust gas substantially directly to the atmosphere and (b) a crankshaft from which conventional mechanical power is derived, the improvement wherein each cylinder includes a high-pressure motor integral and attached in direct contact therewith and a corresponding jet port, the jet port configured to open to release high-pressure exhaust gas to its corresponding high-pressure motor and sized to prevent expansion and cooling of exhaust gases released to the high-pressure motor, the jet port opened only by being uncovered by the position of the piston in the cylinder,
wherein the jet port being opened to release high-pressure exhaust gas is performed prior to exhaust port release of residual exhaust gas to the atmosphere, thereby recovering additional power from the engine without loss of mechanical power from the crankshaft.

13. The reciprocating internal combustion engine of claim 12 wherein there are more than one of the cylinders.

14. The reciprocating internal combustion engine of claim 13 wherein each of the high-pressure motors is a high-pressure turbine.

15. The reciprocating internal combustion engine of claim 13 wherein each of the high-pressure turbines include:
- a case including (a) a cylindrical inner surface, (b) a turbine-inlet conduit formed by the jet port aligned substantially tangential to and terminating at the inner surface, and (c) a turbine-exhaust outlet diverging in cross-section from the inner surface; and
- a cylindrical rotor having two side walls on opposite sides of the rotor and a peripheral surface rotationally-engaged with the inner surface, the side walls and peripheral surface forming a plurality of angled chambers therein, the peripheral surface and the chambers defining a plurality of circumferentially-spaced chamber openings and between-chamber lands on the peripheral surface, each land configured to close the turbine-exhaust outlet, each chamber having a closed bottom, and each chamber having progressively smaller cross-sectional dimensions toward the chamber opening such that each chamber and the turbine-exhaust outlet, when in communication, form a converging-diverging nozzle.

16. The reciprocating internal combustion engine of claim 15 wherein the progressively smaller cross-sectional dimensions extend toward the chamber opening along a majority of the chamber depth.

17. The reciprocating internal combustion engine of claim 15 wherein the turbine-exhaust outlets exhaust to atmospheric pressure.

18. The reciprocating internal combustion engine of claim 15 further including an electrical alternator driven by the high-pressure motors, whereby the engine produces an electrical power output.

* * * * *